United States Patent [19]

Cath et al.

[11] Patent Number: 4,495,558

[45] Date of Patent: Jan. 22, 1985

[54] METHOD AND APPARATUS FOR DETERMINING OXIDE FILM THICKNESS

[75] Inventors: Pieter G. Cath, Orange Village; John Capp, Willowick; William P. Loeffler, Mentor, all of Ohio

[73] Assignee: General Electric Company, Schenectady, N.Y.

[21] Appl. No.: 392,118

[22] Filed: Jun. 25, 1982

[51] Int. Cl.³ .................... G01B 13/02; B01D 59/40; C25F 5/00

[52] U.S. Cl. .................... 364/563; 118/712; 204/1 T; 364/481; 364/496; 427/10

[58] Field of Search ............. 364/482, 563, 496, 497, 364/499, 500, 481; 118/620, 712; 427/10; 134/18; 204/1 T, 434

[56] References Cited

U.S. PATENT DOCUMENTS

| | | | |
|---|---|---|---|
| 1,845,231 | 2/1932 | Browning | 204/434 |
| 3,075,902 | 1/1963 | Bradley et al. | 204/129.2 |
| 3,312,893 | 4/1967 | Currin et al. | 324/64 |
| 3,378,676 | 4/1968 | Clement | 364/469 |
| 3,669,868 | 6/1972 | Leiber et al. | 204/434 |
| 3,692,987 | 9/1972 | Bos | 364/579 |
| 3,975,681 | 8/1976 | Angelini et al. | 204/1 T |
| 4,038,532 | 7/1977 | Burris et al. | 364/557 |
| 4,047,029 | 9/1977 | Allport | 378/90 |
| 4,196,475 | 4/1980 | Hall | 364/482 |
| 4,310,389 | 1/1982 | Harbulak | 204/1 T |

FOREIGN PATENT DOCUMENTS 1405414 9/1975 United Kingdom ............. 204/1 T

OTHER PUBLICATIONS

Pops, et al., The Role of Surface Oxide and its Measurement in the Copper Wire Industry, Wire Journal, Mar. 19, 1977.

P. Seddon, Tin Coatings on Copper Wires–Determination of Thickness by an Electrolytic Method, The Metal Industry, Jan. 15, 1943.

*Primary Examiner*—Errol A. Krass
*Assistant Examiner*—Kevin J. Teska
*Attorney, Agent, or Firm*—John F. McDevitt; Philip L. Schlamp; Fred Jacob

[57] ABSTRACT

Thickness of an electrically insulative metal oxide film deposited on an electrically conductive metal substrate is determined by electrolytically reducing the metal oxide in an electrochemical cell while continuously measuring the cell voltage. A mathematical relationship between the cell voltage change and elapsed time of electrolytic reduction serves as a means for determining thickness of said oxide coating. This method and apparatus is particularly suitable for measurement of the oxide coating thickness on a metal wire substrate.

17 Claims, 3 Drawing Figures

METHOD AND APPARATUS FOR DETERMINING OXIDE FILM THICKNESS

BACKGROUND OF THE INVENTION

This invention relates generally to a quantitative thickness measurement for an electrically insulative metal oxide coating that has been deposited on a metal substrate. The present method is particularly useful in determining the thickness of extremely thin oxide coatings deposited on metal substrates having a difficult shape to measure by direct means such as wires and the like. For example, the oxidized coating on dumet wires that are used as the lead-in conductors in various type electric lamps has been conventionally determined for thickness by visual inspection of the color of the oxide coatings. Such an indirect thickness evaluation is understandably not very precise and leads to undesired variation when the lamps are subsequently manufactured. It would be desirable, therefore, to measure exact thickness of such oxide coatings and in a manner which further lends itself to automated measurement.

The electrolytic reduction of an oxide coating in an electrochemical cell is known. Thickness of the oxide coating can be calculated from the known Faraday relationship between quantity of electricity used, the sample surface area, electrochemical equivalent of the oxide used, and the density of the particular oxide composition. In general, oxide coatings in the range of 10–100 microinches can be measured in this manner accurately within 20–140 seconds, respectively, with existing test equipment. For example, thickness measurement of a cuprous oxide coating on a dumet wire can be determined in an electrochemical cell having a 0.1 normal potassium chloride electrolyte as the reducing agent using the above indicated Faraday equation. For conventional measurement of the oxide coating thickness in this manner, however, the services of a skilled chemist or technician are generally required.

It would be desirable to provide a method and apparatus suitable for automatically measuring metal oxide coating thickness on an electrically conductive metal substrate in a precise and convenient manner. It would be further desirable to do so in a manner which controls test measurement as a function of the sample dimensions and which automatically terminates the test procedure when the oxide coating thickness has been determined.

SUMMARY OF THE INVENTION

According to the method of the invention, a specific relationship between cell voltage rise attributable to electrolytically reducing the oxide coating and the time interval of electrolytic reduction is employed in determining the oxide coating thickness. Specifically, the thickness of an electrically insulative metal oxide coating on an electrically conductive metal substrate is computed automatically in accordance with the present method as follows:

(a) electrolytically reducing the sample of said oxide coating in an electrochemical cell at relatively constant current density while measuring the cell voltage, (b) defining the relationship between cell voltage rise attributable to electrolytically reducing said oxide coating and the time interval of electrolytic reduction in the form of a mathematical curve, (c) determining the final time value needed to completely remove said coating on said mathematical curve as the intersection point between a tangent to said curve and said final cell voltage value, and (d) computing the oxide thickness using the total elapsed time of electrolytic reduction as determined by said final time value.

In the above-mentioned mathematical curve, the cell voltage is plotted as the ordinate while time of electrolytic reduction is plotted as the abscissa. The total elapsed time of electrolytic reduction on said mathematical curve is divided into two parts with the first time interval for an oxidized dumet coating being a cell voltage drop to some minimum value and with the second part being a cell voltage rise from said minimum value attributable to electrolytic reduction of the oxide coating. A total elapsed time for removing said dumet oxide coating is thereby the aggregate time value represented by both time intervals on said mathematical curve. Said total aggregate time value is established on said mathematical curve by intersection between a tangent to the second part of said curve when electrolytic reduction is taking place and the final cell voltage value achieved when all of the oxide coating has been removed.

In the preferred method of implementing the present test procedure, a programmed microprocessor is employed. The appropriate function code is contained in said microprocessor with inputs thereto being provided by an operator and with said inputs enabling the oxide thickness to be automatically determined thereafter for display as well as the test procedure being automatically terminated when said result has been accomplished. Functionally, the thickness measurement is done automatically in three parts whereby sample dimensions are first entered by the operator, then the oxide coating electrolytically reduced at a cell current value determined by the microprocessor program and with thickness of the oxide coating being finally computed in the microprocessor using the above described method steps. The measured cell voltage values are stored and averaged during the time interval when electrolytic reduction takes place in conducting this slope determination for mathematical curve. Termination of test measurement is controlled by said microprocessor upon fulfillment of all following conditions:

(a) time passage of a first time interval,
(b) a cell voltage value exceeding a threshold value, and
(c) no significant further cell voltage rise during a second time interval subsequent to said first time interval.

In accordance with said preferred method for automatically determining the oxide coating thickness with a programmed microprocessor, the sequence of steps being controlled by said microprocessor are as follows:

(a) electrolytically reducing a sample of said oxide coating in an electrochemical cell at relatively constant current density while measuring the cell voltage value, (b) computing the cell current in said microprocessor from the sample dimensions, (c) measuring the cell voltage change with respect to the time interval of electrolytic reduction and storing the measurements in said microprocessor, (d) defining the relationship between cell voltage rise attributable to electrolytically reducing the oxide coating and time interval of electrolytic reduction in the form of a mathematical curve, (e) determining a threshold voltage which is greater in value by a preselected amount than the cell voltage value after a first time interval of cell operation, (f) determining the tangent to said mathematical curve from the stored cell voltage values which are greater by a fixed amount than the minimum cell voltage measured and threafter determining the final time value to remove said coating by intersection between said tangent and the cell voltage value when said coating has been removed, (g) computing the oxide thickness in said microprocessor using the total elaspsed time of electrolytic reduction as determined by said final time value according to the following equation:

$$t = \frac{I_D T E}{D F_C}$$

wherein
- t = oxide thickness, cm.
- $I_D$ = cell current density, amp./cm.$^2$
- T = time value, sec.
- E = oxide equivalent weight, gms./gm. mole
- D = oxide density, gm./cc.
- $F_C$ = Faraday's constant, coulombs/gm. mole, (h) terminating cell operation upon fulfillment of all following conditions:
   (i) time passage of said first time interval,
   (iii) achieving the threshold cell voltage, and
   (iii) no significant further cell voltage rise during a second time interval subsequent to said first time interval.

A threshold value for the cell voltage is established during the above measurement sequence since the cell voltage is dependent upon a member of variable factors including total current, age of the electrolyte solution and still other measuring conditions. For example, said threshold voltage value can be fixed at 0.25 volts above the cell voltage measured five seconds after measurements have commenced. The second time interval employed in the above measurement sequence is used to terminate the measurements when no more than a fixed change in the cell voltage rise occurs during said time interval. Again, no more than a 20 millivolt rise in cell voltage during a five second interval can serve to exemplify the oxidized dumet coating measurement as well as similar measurements upon a borated dumet coating. As distinct from said threshold cell voltage, however, it can be noted from the above measurement sequence that the tangent to said mathematical curve is determined from the stored cell voltage values. For practical purposes, only the voltage values during the latter portion of the measurement need to be used. Provisions were made to store up to 40 seconds worth of values.

DETAILED DESCRIPTION OF THE INVENTION

Figure 1:
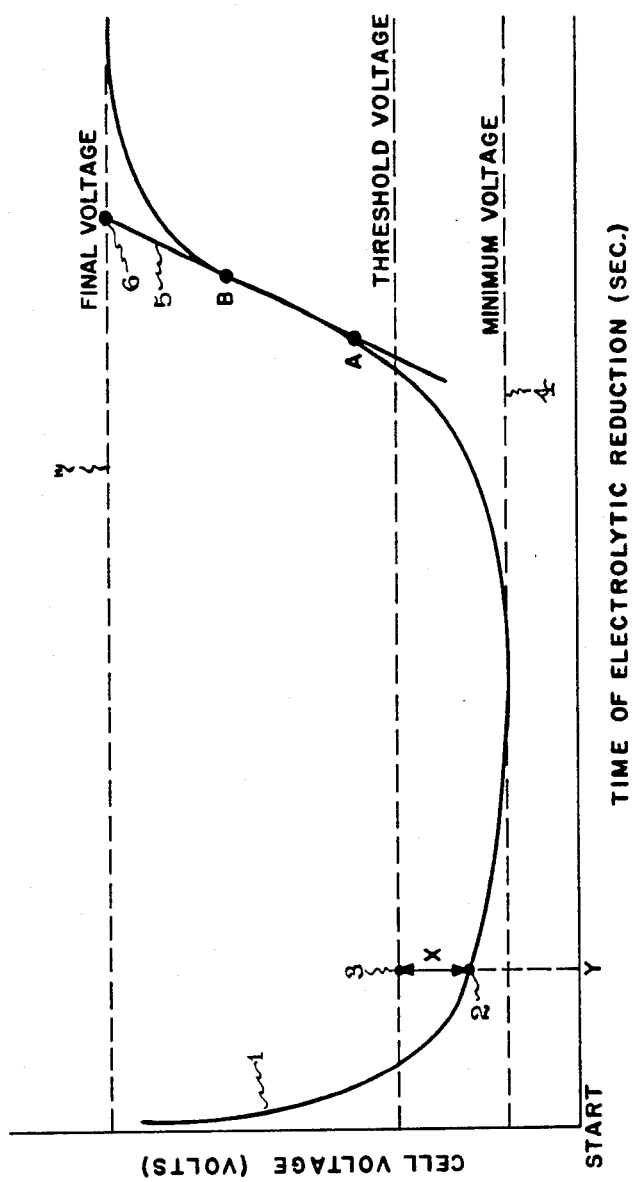
FIG. 1 is a mathematical curve depicting cell voltage change with time passage for measurement of an oxide coating thickness according to the present invention.

Referring to FIG. 1, a graph is depicted illustrating a mathematical curve relationship 1 between cell voltage and time of cell operation to remove an oxide coating deposited on an oxidized dumet wire. The thickness of said oxide coating is determined from said mathematical curve according to the present method by computing the total time interval needed for complete removal of the oxide coating in the associated electrochemical cell. As previously disclosed with respect to said method, this final time value is then employed in the already known Faraday equation to compute the oxide coating thickness. The curve 1 being illustrated results from plotting the voltage measured in said electrochemical cell as the ordinate during the time period when the oxide coating is being removed for a preferred oxidized dumet coating at a constant 12.5 milliamperes per square centimeter current density of cell operation. Said dumet coating comprises copper-clad, nickel-iron core wire oxidized with a surface deposit of copper oxide. A similar curve is obtained for a borated dumet coating wherein said copper clad nickel iron core is oxidized to copper oxide and thereafter given a surface borate deposit. As can be noted from the illustrated curve, the cell voltage being measured in accordance with the present method experiences a decrease during a first time interval "y" from the start of cell operation to some voltage value 2. A threshold voltage value 3 for the cell operation is established at preselected time interval "y" before occurrence of the minimum cell voltage. Said threshold voltage value is arbitrarily selected greater in value by a preselected amount "x" than the measured cell voltage value at time "y" and this voltage value is thereafter used in controlling cell operation according to said preferred method as will be further described.

Commencement of electrolytic reduction produces a voltage rise in the elecrochemical cell from the measured minimum voltage 4 during a second time interval of cell operation. The total time of cell operation needed for complete coating removal is computed according to the present method by means of a tangent 5 to said mathematical curve 1 during this second time interval. Specifically, the computed final time value 6 represents the intersection point between said tangent 5 and the final cell voltage value 7 measured when the oxide coating has been removed. The tangent to said mathematical curve is established from stored cell voltage values measured during the second time interval. To further explain the depicted straight line tangent computation in accordance with said preferred method, the computation at points A and B which establish said tangent are illustrated. Point A is arbitrarily selected as the voltage point which lies 40% between the minimum voltage 4 and the final voltage 7 while point B is arbitrarily selected to be a voltage point 72% between these same voltage values. Using the cell voltage measurements stored in the microprocessor there is selected a number of readings most closely adjacent the computed A and B voltage points and said readings are averaged to produce more accurate values of the selected voltage points. The slope of this tangent line is thereafter computed in said microprocessor along with the final time value obtained by intersection between said slope value and the final cell voltage, all by conventional computation.

Figure 2:
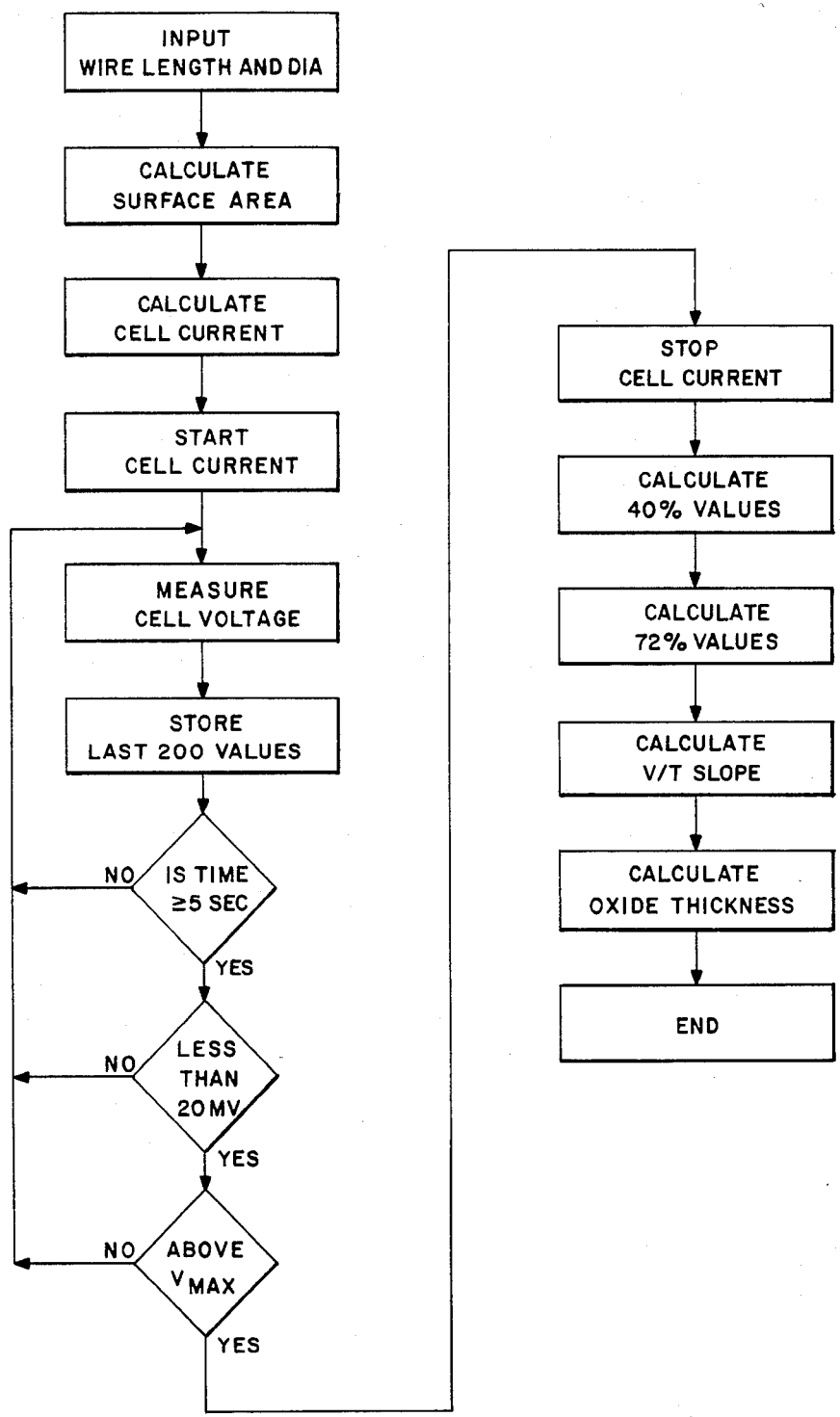
FIG. 2 is a flow chart illustrating the method steps of the present invention as carried out in a preferred manner by means of a programmed microprocessor.

FIG. 2 represents a flow chart illustrating automatic microprocessor determination of the oxide coating thickness in the above described cell operation. According to the depicted sequence steps of said interactive microprocessor program, measurement parameters of the oxidized dumet wire sample are first provided as inputs to the microprocessor by the operator. The appropriate wire diameter and wire length are first inputted to calculate wire surface area along with calculation of the correct current value for cell operation at a predetermined current density. Cell operation is then initiated at the established cell current with cell voltage and time values during cell operation being stored in the memory of said microprocessor for subsequent determination of the relationship between cell voltage rise attributable to electrolytically reducing the oxide coating and the time interval of electrolytic reduction as previously described. The cell operation is terminated as shown in said flow chart upon fulfillment of all conditions with respect to a first time interval of cell operation, achieving a cell voltage value exceeding the threshold value, and no significant further cell voltage rise during a second time interval of cell operation. During the latter time interval, voltage readings can be taken every 0.2 seconds and the last 200 values are stored in memory for calculation of a final time value subsequently used in computing the oxide coating thickness. In accordance with said programmed calculation, the 40% and 72% voltage points are first computed to establish the tangent for the already existing curve represented by the stored voltage and time values. Calculation of the voltage-time slope from said 40% and 72% voltage points is thereafter performed in said microprocessor to establish the total time value for the observed electrolytic reduction, and with said time value being inserted into the Faraday equation for calculation of the oxide thickness. As previously indicated, stored voltage values in the immediate vicinity of said 40% and 72% voltage points are averaged to produce a more accurate calculation of the oxide coating thickness. Various subroutines employed in the actual program for such functions as digital to analog conversion of the cell current, analog to digital conversion of the measured cell voltage values, and still other control functions have not been described since all represent conventional programming operations.

Figure 3:
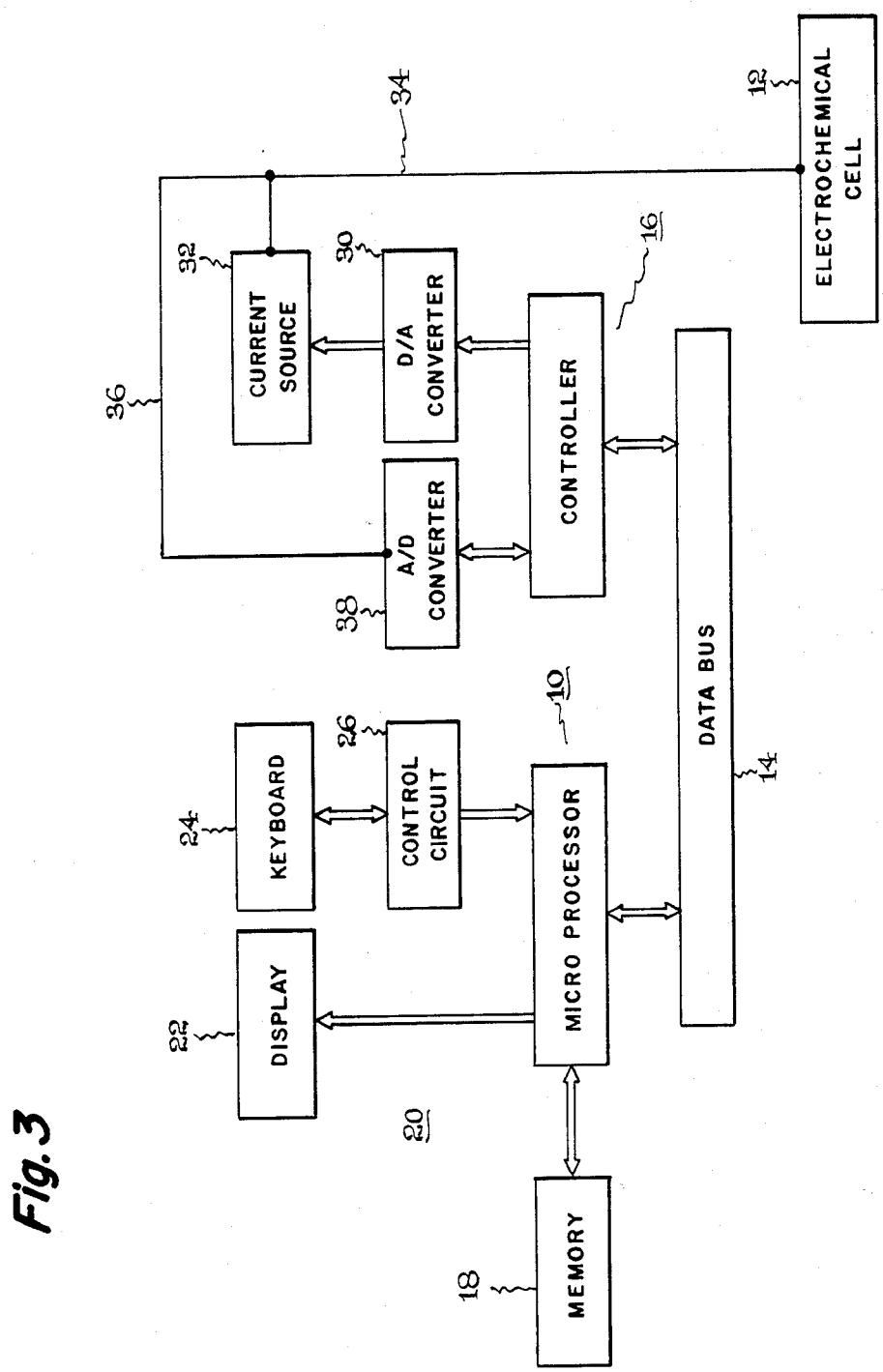
FIG. 3 is a block diagram of the apparatus in which the preferred method of FIG. 2 is carried out.

FIG. 3 is a block diagram of the preferred apparatus for automatically conducting the oxide coating thickness measurement above described. Said measurement system employs microprocessor 10 to automatically compute the oxide thickness as well as control operation of an associated electrochemical cell 12. A conventional data bus 14 permits communication of data and control signals between said micropocessor and electrochemical cell with the cell current being controlled by a conventional electronic controller circuit 16. Said microprocessor 10 includes memory storage registers 18 along with conventional terminal means 20 that contain display means 22 and a keyboard 24 having control circuit 26 to input numerical values and commands such as "start," "stop," "delete," and "enter." Controller 16 utilizes D/A conversion means 30 to regulate the electrical current being applied to the electrochemical cell 12 from a current source 32 which is connected to the cell by conventional conductor means 34. Analog voltage measurements from the electrochemical cell are supplied by electrical conductor means 36 to A/D converter means 38 so that a digital output thereof can be communicated via controller 16 and the data bus 14 to the microprocessor for storage. Wire sample preparation is accomplished by mounting the wire in an appropriate fixture for immersion in the electrolyte solution of the electrochemical cell. The wire is lowered until it touches the electrolyte solution which is sensed automatically in the microprocessor for communication of a message to the display 22. The wire is then lowered into the solution by a precise distance determined by use of conventional gage means. Because the oxide removal is being performed at constant current density, the length and diameter of the wire sample is entered into the apparatus responsive to prompt messages for calculation of the correct current to apply to the associated electrochemical cell.

Although one preferred embodiment of the method and apparatus for the present invention has been described in detail above, it will be apparent to those skilled in the art that various modifications can be made in said preferred embodiment which are still within the spirit and scope of the present invention. For example, it is contemplated to measure the oxide coating thickness automatically on wire samples having various lengths through an appropriate modification of the microprocessor program. It is intended to limit the present invention, therefore, only by the scope of the following claims.

What we claim as new and desire to secure by U.S. Letters Patent is:

1. A method for determining the thickness of an electrically insulative metal oxide coating on an electrically conductive metal substrate sample which comprises:
   (a) electrolytically reducing a sample of said oxide coating in an electrochemical cell at relatively constant current density while measuring the cell voltage,
   (b) defining the relationship between cell voltage rise attributable to electrolytically reducing the oxide coating and the time interval of electrolytic reduction in the form of a mathematical curve, said curve defining the cell voltage rise with time passage from a predetermined threshold voltage value to a final cell voltage value achieved when said oxide coating has been removed by said electrolytic reduction,
   (c) determining the final time value needed to completely remove said coating on said mathematical curve as the intersection point between a tangent to said curve at the region between said threshold voltage value and said final cell voltage value, and
   (d) computing the oxide thickness using the total elapsed time of electrolytic reduction as determined by said final time value.

2. A method as in claim 1 wherein the said substrate sample is a wire of predetermined length.

3. A method as in claim 1 wherein the said substrate sample is copper clad nickel-iron core wire oxidized with a surface deposit of copper oxide.

4. A method as in claim 1 wherein the said substrate sample is copper clad nickel-iron core wire oxidized to copper oxide and having a surface borate deposit.

5. A method as in claim 1 wherein said tangent is a straight line.

6. A method as in claim 1 wherein the steps of said method are controlled by a programmed microprocessor.

7. A method as in claim 6 wherein the cell current is computed from the of said sample dimensions.

8. A method as in claim 6 wherein the measured cell voltage values are stored and averaged during a selected time interval in determining the final time value.

9. A method as in claim 5 wherein the cell voltage values employed in determining said tangent are selected from the measured cell voltage values at fixed amounts greater than the minimum cell voltage value measured.

10. A method as in claim 6 wherein the steps of said method are terminated upon fulfillment of all following conditions:
   (a) time passage of a first time interval,
   (b) a cell voltage value exceeding a threshold value, and
   (c) no cell voltage above a predetermined value is encountered during a second time interval subsequent to said first time interval.

11. A method for automatically determining the electrically insulative thickness of a metal oxide coating on an electrically conductive metal substrate sample utilizing a programmed microprocessor which comprises:
   (a) electrolytically reducing a sample of said oxide coating in an electrochemical cell at relatively constant current density while measuring the cell voltage,
   (b) computing the cell current by said microprocessor from the sample dimensions,
   (c) measuring the cell voltage change with respect to the time interval of electrolytic reduction and storing the measurements in said microprocessor,
   (d) defining the relationship between cell voltage rise attributable to electrolytically reducing the oxide coating and the time interval of electrolytic reduction in the form of a mathematical curve, said curve defining the cell voltage rise with time passage from a predetermined threshold voltage value to a final cell voltage value achieved when said oxide coating has been removed by said electrolytic reduction,
   (e) determining said threshold voltage which is greater in value by a preselected amount than the cell operation,
   (f) determining the tangent to said mathematical curve at the region between said threshold voltage value and said final cell voltage value from the stored cell voltage values which are greater by a fixed amount than the minimum cell voltage measured and thereafter determining the final time value to remove said coating by intersection between said tangent and the cell voltage value when said coating has been removed,
   (g) computing the oxide thickness in said micropressor utilizing the total elapsed time of electrolytic reduction as determined by said final time value according to the following equation:

$$t = \frac{I_D T E}{D F_C}$$

wherein
   t = oxide thickness, cm.
   $I_D$ = cell current density, amp./cm$^2$
   T = time value, sec.
   E = oxide equivalent weight, gms./gm. mole
   D = oxide density, gm./cc.
   $F_C$ = Faraday's constant, coulombs/gm. mole
   (h) terminating the steps of said method upon fulfillment of all following conditions:
      (i) time passage of a said first time interval,
      (ii) achieving the threshold cell voltage, and
      (iii) no cell voltage rise above a predetermined value is encountered during a second time interval subsequent to said first time interval.

12. A method as in claim 11 wherein said substrate sample is a wire of predetermined length.

13. A method as in claim 11 wherein said tangent is a straight line.

14. A measurement system for automatically determining the thickness of an electrically insulative metal oxide coating on an electrically conductive metal substrate sample which comprises:
   (a) an electrochemical cell to electrolytically reduce said oxide coating having means to measure the cell voltage,
   (b) a programmed microprocessor to automatically compute the oxide coating thickness and control operation of said electrochemical cell,
   (c) digital to analog converter means which controls the current being supplied to said electrochemical cell as a function of the sample dimensions computed in said microprocessor,
   (d) analog to digital converter means to supply the cell voltage measurements to said microprocessor, and
   (e) computing means connected to said analog to digital converter means and said digital to analog converter means for
      (i) defining the relationship between cell voltage rise attributable to electrolytically reducing the oxide coating and the time interval of electrolytic reduction in the form of a mathmatical curve, said curve defining the cell voltage rise with time passage from a predetermined threshold voltage value to a final voltage value achieved when said oxide coating has been removed by said electrolytic reduction,
      (ii) determining the final time value needed to completely remove said coating as the intersection point between a tangent to said curve at the region between said threshold voltage value and the final cell voltage value, and
      (iii) computing the oxide thickness using the total elapsed time of electrolytic reduction as determined by said final time value.

15. A measurement system as in claim 14 wherein the measured cell voltage values are stored and averaged during a selected time interval in determining said final time value.

16. A measurement system as in claim 14 wherein said computing means determines a threshold voltage value which is greater in value by a preselected amount than the cell voltage value after a first time interval of cell operation.

17. A measurement system as in claim 14 which further includes means to terminate the measurement system's operation upon fulfillment of all following conditions:
   (a) time passage of a first time interval,
   (b) achieving a threshold voltage value which is greater in value by a preselected amount than the cell voltage value after a first time interval of cell operation, and
   (c) no cell voltage rise above a predetermined value is encountered during a second time interval subsequent to said first time interval.

* * * * *